United States Patent
Niccum

(10) Patent No.: US 8,383,052 B2
(45) Date of Patent: Feb. 26, 2013

(54) SYSTEM FOR A HEAT BALANCED FCC FOR LIGHT HYDROCARBON FEEDS

(75) Inventor: Phillip K. Niccum, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 364 days.

(21) Appl. No.: 12/762,047

(22) Filed: Apr. 16, 2010

(65) Prior Publication Data

US 2011/0257005 A1   Oct. 20, 2011

(51) Int. Cl.
*B01J 8/26* (2006.01)
*B01J 38/30* (2006.01)

(52) U.S. Cl. .......................... 422/144; 422/146; 422/223

(58) Field of Classification Search .................. 422/144, 422/146, 223
See application file for complete search history.

(56) References Cited

U.S. PATENT DOCUMENTS

| | | | |
|---|---|---|---|
| 1,045,471 A * | 11/1912 | Van Zandt | 239/431 |
| 1,259,535 A * | 3/1918 | Leyrer et al. | 431/249 |
| 3,661,800 A | 5/1972 | Pfeiffer et al. | |
| 3,909,392 A * | 9/1975 | Horecky et al. | 208/120.01 |
| 4,035,153 A | 7/1977 | Bunn | |
| 4,062,759 A | 12/1977 | Castagnos et al. | |
| 4,150,090 A | 4/1979 | Murphy | |
| 4,615,992 A | 10/1986 | Murphy | |
| 5,043,522 A | 8/1991 | Leyshon et al. | |
| 5,053,371 A | 10/1991 | Williamson | |
| 5,124,291 A | 6/1992 | Bremer | |
| 5,158,669 A | 10/1992 | Cetinkaya | |
| 5,167,795 A | 12/1992 | Gartside | |
| 5,171,540 A | 12/1992 | Wells | |
| 5,171,921 A | 12/1992 | Gaffney et al. | |
| 5,220,093 A | 6/1993 | Gartside et al. | |
| 5,271,826 A | 12/1993 | Krambeck et al. | |
| 5,565,089 A | 10/1996 | Ramachandran et al. | |
| 5,597,537 A | 1/1997 | Wegerer et al. | |
| 5,730,859 A | 3/1998 | Johnson et al. | |
| 5,965,012 A | 10/1999 | Lomas | |
| 6,113,776 A | 9/2000 | Upson | |
| 6,118,035 A | 9/2000 | Fung et al. | |
| 6,797,239 B1 | 9/2004 | Chen et al. | |
| 7,153,479 B2 | 12/2006 | Peterson et al. | |
| 2004/0069681 A1 | 4/2004 | Peterson | |
| 2004/0069684 A1 | 4/2004 | Tallman | |
| 2007/0193924 A1 | 8/2007 | Ellingsen | |

FOREIGN PATENT DOCUMENTS

| | | |
|---|---|---|
| EP | 0413062 | 2/1991 |
| WO | WO93/00674 | 1/1993 |

* cited by examiner

*Primary Examiner* — Jennifer A Leung
(74) *Attorney, Agent, or Firm* — KBR IP Legal Dept.

(57) ABSTRACT

Catalyst regenerators and methods for using same. The regenerator can include a regenerator housing containing a dense phase catalyst bed for receiving a catalyst to be regenerated. A heater can be disposed in the regenerator and can have a fuel nozzle configured to eject a mixture of fuel and an oxygen-lean gas for combustion to supplement the heat to satisfy the reactor heat demand when a light feedstock cracked that may not provide sufficient coke formation on the catalyst to fully satisfy the reactor heat demand.

10 Claims, 2 Drawing Sheets

SYSTEM FOR A HEAT BALANCED FCC FOR LIGHT HYDROCARBON FEEDS

BACKGROUND OF THE INVENTION

1. Field of the Invention

Embodiments of the present invention generally relate to catalyst deactivation in fluid catalytic cracking units. More particularly, embodiments of the present invention relate to apparatus and method for providing a sufficient amount of heat in a regenerator to satisfy the reactor heat demand when a light feedstock is being cracked that may not provide sufficient coke formation on the catalyst to fully satisfy the reactor heat demand.

2. Description of the Related Art

Fluid catalytic crackers ("FCC") are a mainstay in the conversion of raw hydrocarbons into one or more preferred products. A typical FCC generally includes a few components: one or more riser reactors, one or more disengagers and one or more regenerators. A hydrocarbon feed and one or more catalysts are added to the riser reactor, which is maintained at an elevated temperature and/or pressure. The cracking of the hydrocarbons within the riser reactor produces one or more cracked hydrocarbons and small quantities of carbonaceous coke, which becomes deposited on the surface of the catalyst. The coke deposits deactivate the catalyst after passage through the riser reactor. After exiting the riser reactor, the cracked hydrocarbons and the coked catalyst are introduced to one or more disengagers where the coked catalyst is separated from the cracked hydrocarbons. The cracked hydrocarbons are then removed from the FCC for further processing and/or treatment.

The coked catalyst, on the other hand, is introduced to one or more regenerators where the coke is combusted, oxidized, and/or converted to one or more waste gases. This combustion process removes the coke from the surface of the catalyst, thereby regenerating the catalyst and permitting its recycle back to the riser reactor. At the same time, the combustion of the coke provides heat to increase the regenerator operating temperature so that the circulating catalyst supplies the reactor heat demand. The reactor heat demand consists mostly of the heat required to vaporize and heat the liquid feedstock to the desired reaction temperature as well as the heat of reaction from the hydrocarbon cracking process. Therefore, maintaining high temperatures throughout the FCC and ensuring sufficient coke build-up on the catalyst to provide the heat necessary to regenerate the catalyst are of primary importance in the operation of an FCC.

Light hydrocarbon feeds, those containing twelve or fewer carbon atoms, can be used as a feed to an FCC adapted to produce olefinic hydrocarbons such as ethylene and propylene. However, light hydrocarbon feeds generally produce insufficient coke deposition to support the reactor heat demand. The same can be said of highly hydrotreated and/or severely de-sulfurized feedstock that do not produce enough coke to close the heat balance.

Even at high severity conditions, the above-mentioned FCC units will typically require a supplemental fuel source to maintain catalyst regeneration temperatures. This is traditionally accomplished through the use of liquid oils, such as "torch oil" mixed with a small amount of steam. Although torch oil is generally injected directly into the regenerator fluid bed during start-up of the unit to bring the regenerator temperature up to the desired operating level, some applications employ torch oil continuously during normal operations to maintain a desired regenerator bed temperature. However, because the torch oil is typically injected directly into the oxidizing environment, it can generate extremely high temperatures in the vicinity of the flame and on the catalyst particles and the particles can become overwhelmed and saturated with the torch oil. As a result, the catalyst particles tend to overheat, resulting in an undue deactivation of the cracking catalyst.

There is a need, therefore, for an FCC process and system capable of processing a light feedstock or severely hydrotreated feedstocks that conventionally yield inadequate coke formation, yet improved somehow to satisfy the heat demand of the reaction system

SUMMARY

Catalyst regenerators, heaters, and methods for using the same are provided. In at least one specific embodiment, the catalyst regenerator can include a regenerator housing containing a dense phase catalyst bed configured to receive a catalyst to be regenerated. The catalyst can be at least partially covered with a carbonaceous coke that is combusted to provide a heated catalyst. The catalyst regenerator can also include a heater disposed in the regenerator. The heater can include a body having a first end and a second end, a fuel nozzle disposed within the body and configured to eject a mixture of fuel and steam, a plurality of perforations defined near the second end of the body and configured to draw in the heated catalyst to vaporize the mixture of fuel and steam. The catalyst regenerator can further include a plurality of windows defined near the first end of the body where a vaporized mixture of fuel and steam exits the body into the dense phase catalyst bed.

In at least one specific embodiment, the heater can include a body having a first end and a second end, a fuel nozzle disposed within the body and configured to eject a mixture of fuel and steam, and a plurality of perforations defined near the second end of the body. The plurality of perforations can be configured to draw in a heated catalyst to vaporize the mixture of fuel and steam ejected from the fuel nozzle. The heater can further include a plurality of windows defined near the first end of the body where a vaporized mixture of fuel and steam exits the body.

In at least one specific embodiment, the method can include ejecting a mixture of fuel and steam from a fuel nozzle located in a body of a heater, and drawing in a heated catalyst from a dense phase catalyst bed surrounding the heater and disposed within a regenerator. The method can further include vaporizing at least a portion of the mixture of fuel and steam to form a vaporized mixture of fuel and steam, and directing the vaporized mixture of fuel and steam out of the body and into the dense phase catalyst bed. The vaporized mixture of fuel and steam in the dense phase catalyst bed can then be combusted to provide the requisite heat demanded by the process.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Figure 1:
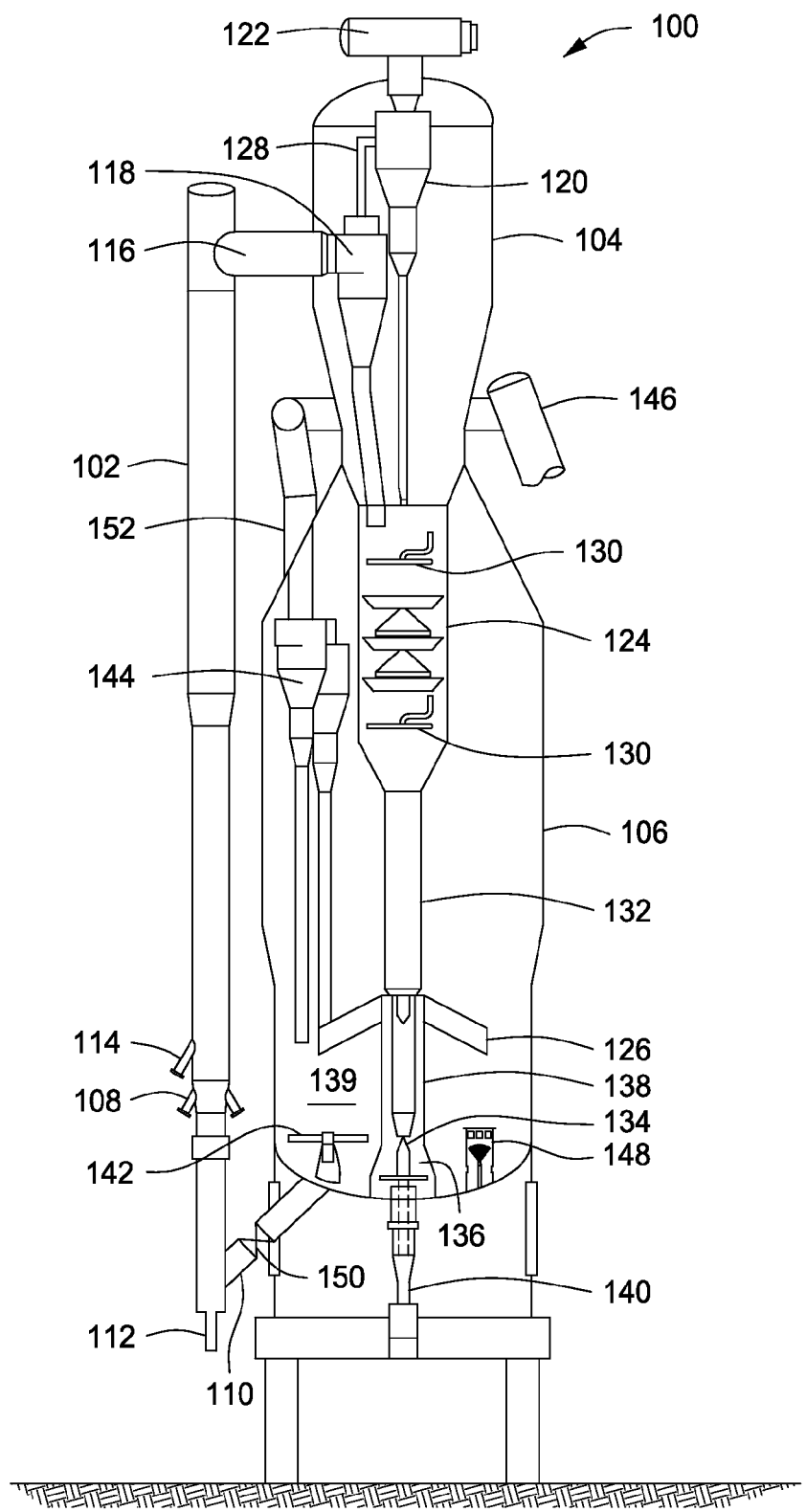
FIG. 1 depicts an illustrative system for upgrading one or more hydrocarbons according to one or more exemplary embodiments described.

FIG. 1 depicts an illustrative system 100 for upgrading one or more hydrocarbons. According to one or more embodiments, the system 100 can include an FCC unit or device that is adapted to recover a hydrocarbon FCC effluent and regenerate the spent catalyst. As used herein, a light FCC unit or process is one in which the hydrocarbon feedstock to the FCC riser has a very low carbon residue content such that there is insufficient carbon (e.g., coke) deposited on the catalyst to sustain the reactor heat demand via combustion from catalyst regeneration without a supplemental fuel source. Other FCC unit embodiments can include a highly hydrotreated and/or severely de-sulfurized feedstock that fail to produce enough coke to close the catalyst regeneration heat balance. The hydrocarbon feedstock, generally having a high olefin content, can be converted into a product-state rich in propylene and ethylene. In one embodiment, the propylene/ethylene product ratio from the FCC unit can be approximately 2.0. The FCC process is very flexible in that it can process many olefin-rich streams which may be available from an olefins plant or a refinery, such as, for example, olefins plant $C_4/C_5$ streams, refinery $C_4$'s, light naphtha produced in thermal or catalytic cracking processes, or the like.

As illustrated, the system 100 can include one or more riser reactors 102, one or more disengagers 104, and one or more regenerators 106. The riser reactor 102 can include any system, device or combination of systems or devices suitable for the cracking of one or more hydrocarbon feeds in the presence of one or more catalysts. In at least one embodiment, the riser reactor 102 can be configured in any physical orientation or geometry, including horizontal (0° elevation), vertical (90° elevation), or any intermediate angle therebetween. In at least one embodiment, the riser reactor 102 can operate at a temperature of from about 200° C. (390° F.) to about 1,700° C. (3,090° F.); about 300° C. (570° F.) to about 1,400° C. (2,550° F.); about 400° C. (750° F.) to about 1,000° C. (1,830° F.); or about 500° C. (930° F.) to about 700° C. (1,290° F.). Furthermore, the riser reactor 102 can operate at a pressure from about 0 kPa (0 psig) to about 2,160 kPa (313 psig); from about 140 kPa (20 psig) to about 1,034 kPa (150 psig); or from about 140 kPa (20 psig) to about 720 kPa (104 psig).

A hydrocarbon feed ("first hydrocarbon feed") can be introduced into the riser reactor 102 via line 108, and can be mixed or otherwise combined with one or more catalysts supplied via line 110 (the "first mixture"), and optionally, steam supplied via line 112. The first hydrocarbon feed in line 108 can include, but is not limited to, one or more hydrocarbon compounds having from four to forty carbon atoms ($C_4$ to $C_{40}$). In one or more embodiments, the first hydrocarbon feed can include, but is not limited to, one or more hydrocarbon compounds having from four to twelve carbon atoms ($C_4$ to $C_p$). The first hydrocarbon feed can have a research octane number of from about 60 to about 88; about 65 to about 88; or about 70 to about 88. In one or more embodiments, the first hydrocarbon feed can have an olefin content from about 0 wt % to about 75 wt %; from about 0 wt % to about 50 wt %; or from about 0 wt % to about 25 wt % The first hydrocarbon feed can have a normal boiling point of from about 95° C. (200° F.) to about 260° C. (500° F.); about 120° C. (250° F.) to about 240° C. (465° F.); or about 150° C. (300° F.) to about 220° C. (430° F.).

The first hydrocarbon feed in line 108 can be partially or completely vaporized prior to introduction to the riser reactor 102. In one or more embodiments, the first hydrocarbon feed in line 108 can be about 25 wt % or more; about 50 wt % or more; about 75 wt % or more; about 90 wt % or more; about 95 wt % or more; about 99 wt % or more; or about 99.9 wt % or more vaporized prior to introduction to the riser reactor 102. The first hydrocarbon feed in line 108 can be introduced to the riser reactor 102 at ambient or elevated temperature. In one or more embodiments, the temperature of the first hydrocarbon feed in line 108 can be a minimum of about 40° C. (105° F.); about 100° C. (212° F.); about 200° C. (390° F.); about 400° C. (750° F.); about 425° C. (800° F.); or about 500° C. (930° F.).

The steam introduced via line 112 can be either saturated or superheated. In one or more embodiments, the steam introduced via line 112 can be saturated, having a minimum supply pressure of about 135 kPa (20 psig); about 310 kPa (44 psig); about 510 kPa (75 psig); about 720 kPa (105 psig); about 1,130 kPa (165 psig); or about 2,160 kPa (315 psig). In one or more embodiments, the steam introduced via line 112 can be superheated having a minimum superheat of about 15° C. (30° F.); about 30° C. (60° F.); about 45° C. (90° F.); about 60° C. (120° F.); or about 90° C. (150° F.).

The one or more catalysts supplied via line 110 can include catalysts suitable for catalytically cracking the first and/other, yet to be described, hydrocarbon feeds to provide one or more olefinic hydrocarbons and/or one or more mixed hydrocarbons suitable for blending into one or more fungible products including, but not limited to one or more olefins, one or more paraffins, one or more naphthenes, one or more aromatics or any combination thereof. The one or more catalysts can include, but are not limited to, one or more of the following: ZSM-11, ZSM-12, ZSM-23, ZSM-35, ZSM-38, metal impregnated catalysts, zeolites, faujasite zeolites, modified faujasite zeolites, Y-type zeolites, ultrastable Y-type zeolites (USY), rare earth exchanged Y-type zeolites (REY), rare earth exchanged ultrastable Y-type zeolites (REUSY), rare earth free Z-21, Socony Mobil #5 zeolite (ZSM-5), high activity zeolite catalysts, mixtures thereof or combinations thereof.

A second hydrocarbon feed, supplied via line 114 can be introduced at any point within the riser reactor 102. In one or more embodiments, the second hydrocarbon feed in line 114 can be introduced at the same point as the first hydrocarbon feed in line 108. In other embodiments, such as the illustrated exemplary embodiment, the second hydrocarbon feed in line 114 can be introduced at a point in time subsequent to the first hydrocarbon feed in line 108. In one or more embodiments, the second hydrocarbon feed in line 114 can be introduced simultaneously, sequentially, alternatively or in any other manner or frequency in relation to the first hydrocarbon feed in line 108.

In an exemplary embodiment, the second hydrocarbon feed in line 114 can be partially or completely vaporized prior to introduction to the riser reactor 102. In one or more embodiments, the second hydrocarbon feed in line 114 can be about 5 wt % or more; about 10 wt % or more; about 25 wt % or more; about 50 wt % or more; about 75 wt % or more; about 90 wt % or more; or about 99.9 wt % or more vaporized prior to introduction to the riser reactor 102. The second hydrocarbon feed in line 114 can be introduced to the riser reactor 102 at ambient or elevated temperatures. For example, in one or more embodiments the second hydrocarbon feed in line 114 can be at a temperature of about 40° C. (105° F.) or more; about 100° C. (212° F.) or more; about 200° C. (390° F.) or more; or about 370° C. (700° F.) or more.

The catalyst supplied via line 110 can be introduced to the riser reactor 102 at a rate proportionate to the first hydrocarbon feed, the second hydrocarbon feed, or the combined first and second hydrocarbon feeds. In one or more embodiments, the catalyst feed-to-hydrocarbon feed weight ratio can range from a minimum of about 4:1; about 8:1; or about 12:1 to a maximum of about 18:1; about 25:1; about 30:1; or about 70:1. In one or more embodiments the catalyst feed-to-hydrocarbon feed weight ratio in the riser reactor 102 can be about 4:1 to about 30:1. In one or more embodiments, the one or more catalysts can be introduced to the riser reactor 102 at a temperature above the temperature of the first mixture to provide heat for increasing the feed temperature to final reaction temperature and to sustain the endothermic cracking reactions. In one or more embodiments, the temperature of the catalyst can range from a minimum of about 600° C. (1,110° F.); about 650° C. (1,200° F.); or about 700° C. (1,290° F.) to a maximum of about 785° C. (1,445° F.); about 815° C. (1,500° F.); or about 850° C. (1,560° F.). The first mixture can be maintained at a first temperature of from about 300° C. (570° F.) to about 900° C. (1,650° F.); about 400° C. (750° F.) to about 800° C. (1,470° F.); or about 500° C. (930° F.) to about 700° C. (1,290° F.).

In an exemplary embodiment, within the riser reactor 102, the first hydrocarbon feed and second hydrocarbon feed, and the one or more catalysts can crack, react, convert, and/or otherwise recombine to provide a mixture containing one or more cracked hydrocarbons ("second cracked mixture"). As the hydrocarbons present in the riser reactor 102 crack and fractionate to form finished products, at least a portion of the first and second hydrocarbon feeds can deposit as a layer of carbonaceous coke on the exterior surface of the catalysts. The deposition of coke on the surface of the catalyst deactivates the catalyst, forming coke-covered catalyst. The coke-covered catalyst can exit the riser reactor 102 suspended in the second cracked mixture via line 116.

In at least one embodiment, the fuel or coke-producing value of the second hydrocarbon feed in line 114 can be sufficient to maintain the desired temperature within the riser reactor 102. In one or more embodiments, the temperature of the catalyst introduced to the riser reactor 102 can be adjusted by varying the deposition of coke on the surface of the catalyst. The quantity of coke deposited on the catalyst can be adjusted, for example, by varying the second hydrocarbon feed to the reactor 102. In one or more embodiments, the pressure and temperature within the riser reactor 102 can be maintained at "high severity" conditions, as defined above. In at least one embodiment, the first and high severity temperatures can be substantially similar, i.e. having a difference less than 55° C. (100° F.). Other embodiments can include the first and high severity temperatures having a difference greater than 55° C. (100° F.).

Operation of the riser reactor 102 at high severity conditions can favor the cracking of the first and second hydrocarbon feeds into one or more olefinic compounds, such as ethylene and propylene, and one or more mixed hydrocarbons being provided via line 116. In one or more embodiments, the second cracked mixture in line 116 can have an ethylene concentration of from about 0.1 vol. % to about 20 vol. %; about 0.5 vol. % to about 17 vol. %; or from about 1 vol. % to about 15 vol. %. In one or more embodiments, the second cracked mixture in line 116 can have a propylene concentration of from about 0.1 vol. % to about 25 vol. %; about 0.5 vol. % to about 17 vol. %; or from about 1 vol. % to about 15 vol. %. In one or more embodiments, in the second cracked mixture in line 116 can have a mixed hydrocarbons concentration of from about 1 vol. % to about 75 vol. %; about 5 vol. % to about 40 vol. %; or from about 5 vol. % to about 30 vol. %. In one or more embodiments, the second cracked mixture in line 116 can have a solids concentration of from about 500 ppmw to about 98 wt %; about 2,500 ppmw to about 75 wt %; about 1 wt % to about 50 wt %; or from about 5 wt % to about 50 wt %.

In one or more embodiments, at least a portion of the mixed hydrocarbons in the second cracked mixture in line 116 can be used to provide a high octane gasoline blendstock. In at least one embodiment, the one or more mixed hydrocarbons present in the second cracked mixture in line 116 can have a research octane number greater than the research octane number of the first hydrocarbon feed in line 108. In one or more embodiments, the one or more mixed hydrocarbons in the second cracked mixture in line 116 can have a research octane number of from about 88 to about 100; about 88 to about 97; or about 88 to about 92. In one or more embodiments, the mixed hydrocarbons in the second cracked mixture can have a bulk normal boiling point of from about 95° C. (200° F.) to about 260° C. (500° F.); about 120° C. (250° F.) to about 240° C. (465° F.); or about 150° C. (300° F.) to about 220° C. (430° F.).

The second cracked mixture exiting the riser reactor 102 via line 116 can be introduced to the one or more disengagers 104. As further illustrated in FIG. 1, the one or more disengagers 104 of the system 100 can include one or more riser cyclones 118, upper cyclones 120, plenums 122, catalyst strippers 124, and catalyst distributors 126. Within the disengager 104, the second cracked mixture can flow into the one or more riser cyclones 118 wherein at least a portion of the coke-covered catalyst can be selectively separated from the second cracked mixture. The near solids-free second cracked mixture can exit the one or more riser cyclones 118 via line 128, flowing into the one or more upper cyclones 120 wherein additional coke-covered catalyst can be separated.

The product effluent gases from the second cracked mixture can then be recovered from the top of the one or more disengagers 104 and into the one or more disengager plenums 122 for withdrawal and subsequent fractionation or separation into one or more finished hydrocarbon products. In at least one embodiment, a finished hydrocarbon product can include propylene, ethylene, and/or one or more mixed hydrocarbons. In other embodiments the product effluent gases can be cooled to generate steam in a waste heat boiler (not shown), and then routed to a quench tower (not shown) where any remaining entrained catalyst is washed from the gases by contact with circulating quench oil. In yet other embodiments, the product effluent gases can be used as a supplemental fuel source in the regenerator 104, as will be described below. The product effluent gases can have a solids concentration of from about 5 ppmw to about 5 wt %; about 10 ppmw to about 4 wt %; about 25 ppmw to about 3.5 wt %; or from about 50 ppmw to about 3 wt %.

The coke-covered catalyst separated from the second cracked mixture in the one or more riser cyclones 118 and the one or more upper cyclones 120 can be introduced to the one or more catalyst strippers 124. Within the catalyst strippers 124, steam can be introduced into the coke-covered catalyst using one or more steam distributors 130. As is known in the art, the passage of steam through the catalyst stripper 124 can assist in removing any residual hydrocarbons entrained or entrapped within the coke-covered catalyst prior to regenerating the catalyst. As such, the steam can be adapted to strip one or more hydrocarbons from the coke-covered catalyst and carry it into one or more upper cyclones 120 of the disengager 104. In other embodiments, the catalyst strippers 124 do not include steam distributors 130.

The steam supplied to the catalyst stripper 124 via the one or more distributors 130 can be saturated or superheated. In one or more embodiments, the steam introduced via the one or more distributors 130 can be saturated, having a minimum supply pressure of about 135 kPa (20 psig); about 310 kPa (44 psig); about 510 kPa (75 psig); about 720 kPa (105 psig); about 1,130 kPa (165 psig); or about 2,160 kPa (315 psig). In one or more embodiments, the steam introduced via the one or more distributors 130 can be superheated having a minimum superheat of about 15° C. (30° F.); about 30° C. (60° F.); about 45° C. (90° F.); about 60° C. (120° F.); or about 90° C. (150° F.).

In at least one embodiment, coke-covered catalyst can flow from the catalyst stripper 124 into a standpipe 132 having a plug valve 134 located in a catalyst centerwell 136. In exemplary operation, coke-covered catalyst can flow down the standpipe 132 and pass through the catalyst plug valve 134, whereupon the catalyst changes direction and flows upwardly through the annulus 138 of the catalyst centerwell 136 using a fluidization medium introduced via line 140 to the catalyst centerwell 136. In one or more embodiments, the fluidization medium, or gas, can be, for example, steam, an inert gas, and/or fuel gas. In at least one embodiment, an oxygen-containing gas is not used as the fluidization gas in order to avoid, or at least minimize, combustion within the catalyst centerwell 136.

As the coke-covered catalyst moves upwardly in the annulus 138, it can be eventually diverted outwardly into a dense phase catalyst bed 139 of the regenerator 106 via the one or more catalyst distributors 126. In one or more embodiments, about 5 wt %; about 10 wt %; about 25 wt %; about 50 wt %; about 75 wt %; about 85 wt %; about 90 wt %; about 95 wt %; or about 99 wt % of the coke-covered catalyst in the standpipe 132 can be introduced to the one or more regenerators 106 via the one or more catalyst distributors 126.

The one or more regenerators 106 can include one or more air distributors 142, one or more regenerator cyclones 144, one or more regenerator plenums 146, and at least one heater 148. While not required or necessary, other embodiments of the disclosure can also include one or more torch nozzles (not shown) in the regenerator 106, as described above. In one or more embodiments, the air distributors 142 can be configured to oxidize, or aerate, the dense phase catalyst bed 139 of the regenerator 106 with one or more oxidants. The addition of an oxidant to the coke-covered catalyst discharged from the catalyst distributors 126 can result in the oxidation and/or combustion of the coke on the surface of the catalyst into one or more waste gases including, but not limited to, carbon monoxide, carbon dioxide, hydrogen, water vapor, and/or combinations thereof. In an exemplary embodiment, the combustion temperatures in the regenerator 106 can be about 1300° F.; or from about 1250° F. to about 1350° F.; or from about 1275° F. to about 1325° F. As used herein, the term "oxidants" can refer to any compound or element suitable for oxidizing the coke on the surface of the catalyst. Such oxidants can include, but are not limited to, oxygen enriched air (air having an oxygen concentration greater than 21 wt %), oxygen, or nitrogen enriched air (air having a nitrogen concentration greater than 79 wt %).

The removal of the coke from the surface of the catalyst can re-expose the surface of the catalyst, thereby reactivating and/or regenerating the catalyst. All or at least a portion of the reactivated and/or regenerated catalyst can be recycled from the regenerator 106 to the one or more riser reactors 102 via valve 150 disposed in line 110. Moreover, all or at least a portion of fresh catalyst make-up can be added to the system 100 via addition to either the one or more riser reactors 102 and/or the regenerator 106.

The one or more waste gases generated by the oxidation and/or combustion of the coke can flow into the one or more regenerator cyclones 144 wherein at least a portion of the catalyst suspended in the waste gases can be removed and returned to the regenerator 106. The waste gases can exit the regenerator cyclones 144 via one or more ducts 152 to be collected in the regenerator plenum 146, and thereafter directed for subsequent recovery, reuse, recycle, treatment, and/or disposal.

Figure 2:
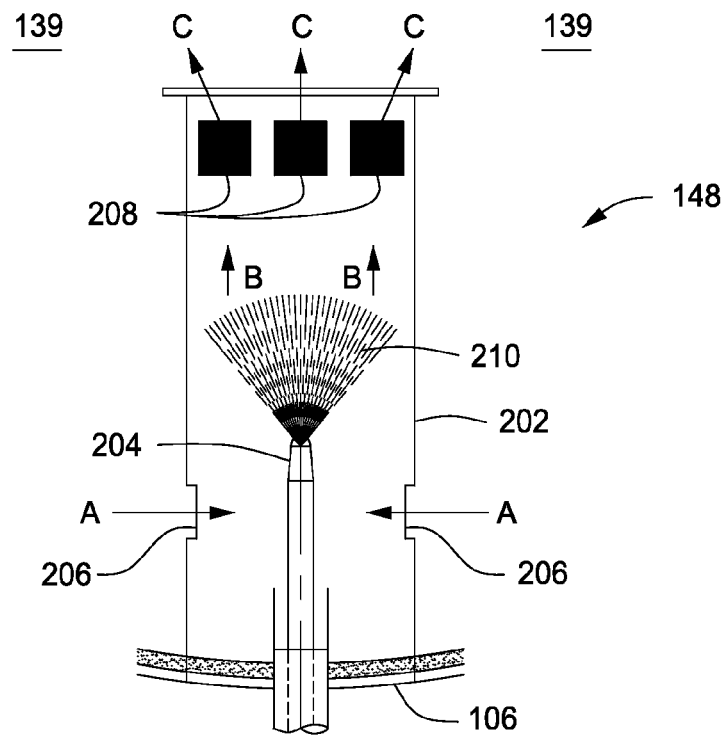
FIG. 2 depicts an illustrative regenerator nozzle according to one or more exemplary embodiments described.

In applications using a light feedstock that can yield inadequate coke formation on the catalyst, and therefore provide insufficient heat of reaction to support the reactor heat demand, one or more embodiments of the disclosure can implement at least one heater 148 configured to supplement the heat provided by coke combustion in the regenerator 106. In at least one embodiment, the heater 148 can be configured to indirectly inject a fuel oil, or gas, into the regenerator 106, wherein the fuel oil serves as a supplemental fuel source to the coke formed on the catalyst, thereby assisting in the oxidation and/or combustion of the coke. The fuel oil can include fuel gas, torch oil, liquid oil, heavy cycle oil, light cycle oil, diesel, and/or any hydrocarbon. In at least one embodiment, the fuel oil can include the product effluent gas derived as one of the products of the system 100, as explained above. The heater 148 can also be adapted to indirectly inject an oxygen-lean gas into the heater 148 in conjunction with the fuel oil, thereby creating a fuel and gas mixture 210 (FIG. 2). In one embodiment, the oxygen-lean gas can be steam. In other embodiments, the oxygen-lean gas can be any oxygen deficient gas, such as nitrogen, $CO_2$, reduced oxygen content air, etc., without departing from the scope of the disclosure. The fuel and gas mixture 210 can facilitate the dispersion and atomization of the fuel oil as it discharges.

The heater 148 can be mounted to the bottom-wall of the regenerator 106, outside of the catalyst centerwell 136. However, as can be appreciated, other embodiments can include alternative placement of the heaters 148, including on the vertical walls, inside the catalyst centerwell 136, or in any configuration that supports sufficient indirect fuel injection into the dense phase catalyst bed 139.

Referring now to FIG. 2, illustrated is an exemplary heater 148 according to at least one embodiment of the disclosure. The heater 148 can include a body 202 having a fuel oil nozzle 204 disposed therein and configured to eject the fuel and gas mixture 210. In one embodiment, the body 202 can be a cylindrical body with the fuel oil nozzle 204 concentrically disposed therein; however, other embodiments can include a square, rectangular, hexagonal, or oval body 202 without departing from the spirit of the disclosure. In one or more embodiments, the body 202 can define a plurality of perforations 206 near the bottom of the body 202, and a plurality of windows 208 near the top of the body 202.

In one or more embodiments, the body 202 can be adapted to substantially isolate the fuel and gas mixture 210 ejected from the fuel oil nozzle 204 from the oxidative environment of the dense phase catalyst bed 139 in the regenerator 106. In exemplary operation, heated catalyst from the dense phase catalyst bed 139 can be circulated through the heater 148 and configured to vaporize the fuel and gas mixture 210 in order to supplement the catalyst regeneration combustion process. In at least one embodiment, as the fuel and gas mixture 210 is ejected from the fuel oil nozzle 204, a low pressure region can be formed within the heater 148, thereby drawing in a portion of the heated catalyst from the dense phase catalyst bed 139 through the perforations 206 in the direction of arrows A and upwardly through the body 202 in the direction of arrows B. In at least one embodiment, the catalyst entering through the perforations 206 can be at the combustion temperature of the regenerator 106, thereby serving to vaporize the fuel and gas mixture 210 upon contact with the catalyst. The vaporized fuel and gas mixture 210, in conjunction with the catalyst particulates, can then exit the body 202 through the windows 208 in direction C into the oxidative environment of the dense phase catalyst bed 139 where its combustion supplements the catalyst regeneration combustion process. In an exemplary embodiment, the heater 148 can provide from about 5% to about 90% of the extra heat needed to maintain the heat for oxidation reaction in the regenerator 106.

In other embodiments, the heated catalyst need not be circulated through the heater 148 to vaporize the fuel and gas mixture 210. For example, the fuel oil ejected from the fuel oil nozzle 204 can be fuel gas or liquefied petroleum gas that may not require additional heat from the circulating catalyst for proper vaporization. Thus, in at least one embodiment, the body 202 may not require the plurality of perforations 206 defined near its bottom for the introduction and circulation of heated catalyst.

In embodiments using a fuel oil that is normally a liquid in the available supply condition, such as FCC light cycle oil, the heat from the circulating catalyst can cause the fuel oil to vaporize and increase in volume prior to its exposure to the oxidative environment of the dense phase catalyst bed 139. In embodiments using a fuel oil in gas phase, such as refinery fuel gas, the circulation of the hot catalyst in the fuel and gas mixture 210 prior to its exposure to the oxidative environment within the dense phase catalyst bed 139, will cause the gaseous fuel oil to also expand in volume. Expanding the fuel oil volume in either state creates a fuel oil that is less concentrated when contacting the catalyst in the dense phase catalyst bed 139, and thereby less likely to cause excessive temperatures of the catalyst particles upon combustion.

In one or more embodiments, the influx flowrate of the catalyst through the perforations 206 can be adjusted by varying the size of the perforations 206. Other embodiments can allow adjustment of the influx flowrate by varying the ejection flowrate of the fuel and gas mixture 210 out of the fuel oil nozzle 204. As an example, the following table illustrates how much heated catalyst is required to vaporize an amount of fuel/stream mixture (i.e., heat fuel) so as to increase the regenerator bed temperature by 100° F.:

| Heat Regenerator Bed Temperature 100 Degrees F. | |
|---|---|
| Regenerator Catalyst Circulation Rate, TPM | 24.2 |
| Required Heat Input from Heater, MM btu/hr | 79.7 |
| Fuel   Type | LCO |
|   Heat of Combustion, btu/lb | 17,960 |
|   Vapor Heat Capacity, btu/lb-F | 0.6042 |
|   Heat of Vaporization, btu/lb | 118 |
|   Fuel Density, lb/cu.ft. | 56.9 |
|   Fuel Rate, lb/hr | 887 |
|   Fuel Rate, gpm | 1.95 |
|   Fuel Rate, barrels per hour | 2.8 |
| Heat Required to Vaporize and Heat Fuel to Regenerator Temperature, MM btu/hr | 1.7 |
| Catalyst to Fuel Ratio in Heater, w/w | 4.7 |
| Catalyst Circulation through Heater, lb/hr | 20,700 |
| Catalyst Temperature drop through Heater, F. | 300 |

Figure 3:
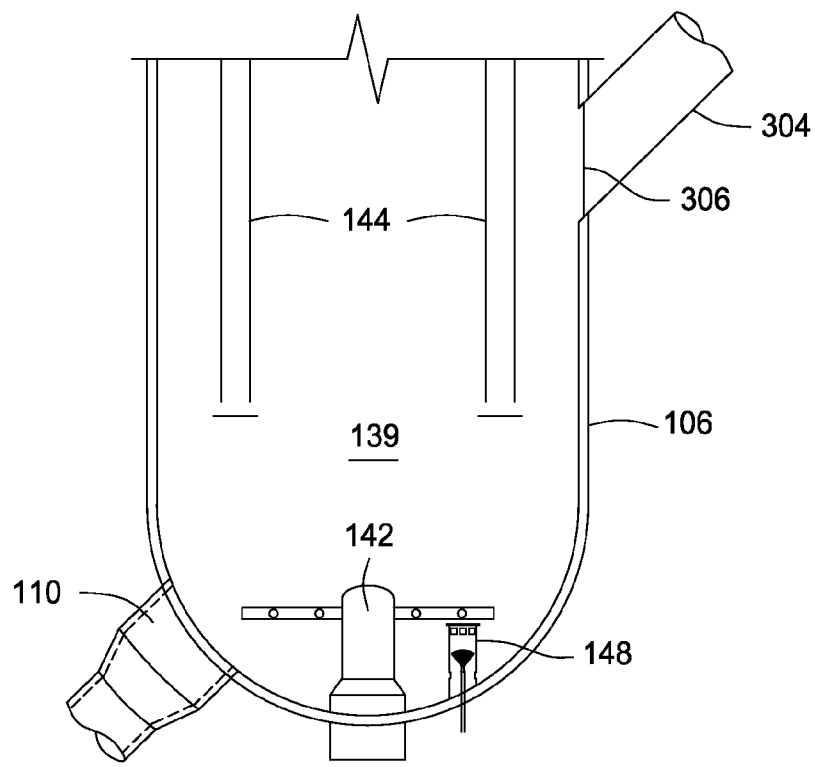
FIG. 3 depicts an illustrative regenerator having a regenerator nozzle disposed therein, according to one or more exemplary embodiments described.

Referring now to FIG. 3, with continued reference to FIG. 1 and FIG. 2, illustrated is an exemplary embodiment depicting a heater 148 disposed in an FCC regenerator 106 without a standpipe 132, a plug valve 134, or a catalyst centerwell 136. The heater 148 as depicted in FIG. 3 can operate similar to the embodiment discussed in FIG. 2. As illustrated, the coke-covered catalyst can be deposited into the dense phase catalyst bed 139 of the regenerator 106 via an angled pipe 304 having an inlet 306. The ends of a pair of regenerator cyclones 144 can extend into the dense phase catalyst bed 139 and one or more air distributors 142 can be configured to aerate the dense phase catalyst bed 139 with one or more oxidants, as described above. While in the dense phase catalyst bed 139, the coke on the catalyst can be burned off to produce regenerated catalyst, and any waste gases can be removed via the regenerator cyclones 144. In an exemplary embodiment, a portion of the heated catalyst can be circulated through the heater 148 to vaporize a fuel and gas mixture 210 (FIG. 2), thereby providing a supplemental fuel to elevate and maintain the regeneration heat of reaction in the dense phase catalyst bed 139. Regenerated catalyst can be recycled to the riser reactors 102 via line 110 as needed.

As can be appreciated, conventional FCC units can easily be retrofitted with the exemplary heater 148 embodiments disclosed herein. In the embodiments disclosed herein, the heater 148 can either replace or supplement a torch nozzle. For example, embodiments discussed herein can allow the temperature of the regenerator 106 to be elevated to a level consistent with the requirements of the FCC process without causing undue catalyst deactivation normally associated with direct injection of fuel into the dense phase catalyst bed 139, as is the case with conventional torch nozzles. Such direct fuel injection can generate extremely high temperatures in the vicinity of the resulting flame, cause catalyst particles to suffer undue deactivation, or over-saturate the surrounding catalyst particles with fuel oil. Advantageously, the heater 148 does not necessarily inject fuel oil directly into the oxidative environment, as explained herein. Instead, the fuel and gas mixture 210 (FIG. 2) is vaporized by the circulation of heated catalyst prior to exiting the heater 148, thereby creating a supplementary fuel oil that is less concentrated when contacting the catalyst in the dense phase catalyst bed 139. Moreover, unlike conventional torch nozzle operations, the heater 148 can operate continuously during FCC system 100 operations.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A catalyst regenerator, comprising:
    a regenerator housing containing a dense phase catalyst bed configured to receive a catalyst to be regenerated, wherein the catalyst is at least partially covered with a carbonaceous coke that is combusted to provide a heated catalyst;
    a heater disposed in the regenerator comprising:
    a body having a first end and a second end;
    a fuel nozzle disposed within the body and configured to eject a mixture of fuel and oxygen-lean gas; and
    a plurality of windows defined near the first end of the body where a vaporized mixture of fuel and oxygen-lean gas exits the body into the dense phase catalyst bed.

2. The catalyst regenerator of claim 1, further comprising a plurality of perforations defined near the second end of the body and configured to draw in the heated catalyst to vaporize the mixture of fuel and oxygen-lean gas.

3. The catalyst regenerator of claim 1, further comprising:
    a standpipe portion and a plug valve assembly for receiving the catalyst to be regenerated;
    a centerwell receiving a lower end of the standpipe portion and defining an annulus around the lower end of the standpipe portion, wherein the plug valve assembly is configured to introduce the catalyst into the annulus;
    a catalyst distributor communicably coupled to the annulus and configured to disperse the catalyst into the dense phase catalyst bed where the carbonaceous cope is combusted;
    an air distributor disposed in the dense phase catalyst bed for introducing an oxidant into the dense phase catalyst bed; and
    a catalyst discharge outlet in fluid communication with the dense phase catalyst bed.

4. The catalyst regenerator of claim 3, wherein the oxidant is oxygen enriched air having an oxygen concentration greater than 21 wt %.

5. The catalyst regenerator of claim 3, further comprising a torch oil nozzle disposed in the regenerator.

6. The catalyst regenerator of claim 1, wherein the heater is disposed in the dense phase catalyst bed.

7. The catalyst regenerator of claim 1, wherein the fuel comprises a fuel gas, torch oil, liquid oil, heavy cycle oil, light cycle oil, or diesel.

8. The catalyst regenerator of claim 1, wherein the fuel comprises a product effluent gas derived from a fluid catalytic cracking unit, 9. The catalyst regenerator of claim 1, wherein the oxygen-lean gas is steam.

10. The catalyst regenerator of claim 1, wherein the body is disposed in an oxidative environment of the dense phase catalyst bed, and the body is configured to substantially isolate the mixture of fuel and oxygen-lean gas from the oxidative environment.

* * * * *